US009740081B1

United States Patent
Kaminski (10) Patent No.: US 9,740,081 B1
(45) Date of Patent: Aug. 22, 2017

(54) DOUBLE LENS DEVICE FOR TUNABLE HARMONIC GENERATION OF LASER BEAMS IN KBBF/RBBF CRYSTALS OR OTHER NON-LINEAR OPTIC MATERIALS

(71) Applicant: IOWA STATE UNIVERSITY RESEARCH FOUNDATION, INC., Ames, IA (US)

(72) Inventor: Adam Kaminski, Ames, IA (US)

(73) Assignee: Iowa State Research Foundation, Inc., Ames, IA (US)

( * ) Notice: Subject to any disclaimer, the term of this patent is extended or adjusted under 35 U.S.C. 154(b) by 119 days.

(21) Appl. No.: 14/627,925

(22) Filed: Feb. 20, 2015

(51) Int. Cl.
| G02F 1/35 | (2006.01) |
|---|---|
| G02F 1/355 | (2006.01) |
| G02F 1/37 | (2006.01) |
| G02B 7/02 | (2006.01) |
| G02B 7/00 | (2006.01) |

(52) U.S. Cl.
CPC .......... *G02F 1/3544* (2013.01); *G02B 7/005* (2013.01); *G02B 7/023* (2013.01); *G02F 1/3501* (2013.01); *G02F 1/3551* (2013.01); *G02F 1/37* (2013.01); *G02F 2001/3503* (2013.01)

(58) Field of Classification Search
CPC .... G02F 1/3501; G02F 1/3544; G02F 1/3551; G02F 2001/3503
See application file for complete search history.

(56) References Cited

U.S. PATENT DOCUMENTS

| 3,530,301 | A | * | 9/1970 | Boyd | G02F 1/3534 330/4.5 |
|---|---|---|---|---|---|
| 5,943,161 | A | * | 8/1999 | Shinozaki | G02F 1/3534 359/326 |
| 6,500,364 | B2 | | 12/2002 | Reynolds et al. | |
| 6,859,305 | B2 | | 2/2005 | Chen et al. | |
| RE43,421 | E | * | 5/2012 | Zhang | 372/19 |
| 8,274,743 | B2 | | 9/2012 | Scaggs | |
| 8,422,119 | B1 | * | 4/2013 | Keaton | G02F 1/35 359/326 |
| 8,576,479 | B2 | * | 11/2013 | Dam | G02F 1/3534 359/326 |
| 8,834,629 | B2 | | 9/2014 | Kolis et al. | |
| 8,934,510 | B2 | * | 1/2015 | Kakizaki | H01S 3/10007 372/100 |

(Continued)

OTHER PUBLICATIONS

Chen, C.T. et al.,"Deep-UV nonlinear optical crystal KBe2BO3F2—discovery, growth, optical properties and applicants" Apppl. Phys. B 97:9-25. Jan. 13, 2009.

(Continued)

*Primary Examiner* — Daniel Petkovsek
(74) *Attorney, Agent, or Firm* — McKee, Voorhees & Sease PLC (57) ABSTRACT

A method and apparatus to generate harmonically related laser wavelengths includes a pair of lenses at opposing faces of a non-linear optical material. The lenses are configured to promote incoming and outgoing beams to be normal to each outer lens surface over a range of acceptance angles of the incoming laser beam. This reduces reflection loss for higher efficiency operation. Additionally, the lenses allow a wider range of wavelengths for lasers for more universal application. Examples of the lenses include plano-cylindrical and plano-spherical form factors.

13 Claims, 10 Drawing Sheets

(56) References Cited

U.S. PATENT DOCUMENTS

| | | | |
|---|---|---|---|
| 2011/0222143 A1 | 9/2011 | Chen et al. | |
| 2011/0243163 A1* | 10/2011 | Peng | G02F 1/3534 372/22 |
| 2014/0071519 A1 | 3/2014 | Chen et al. | |
| 2015/0001375 A1* | 1/2015 | Dam | G02F 1/3534 250/208.1 |

OTHER PUBLICATIONS

Chen, Chuangtian et al., "Improved Sellmeier Equations and Phase-Matching Characteristics in Deep-Ultraviolet Region of KBe2BO3F2 Crystal" IEEE Journal of Quantum Electronics, vol. 44, No. 7, pp. 617-621, Jul. 7, 2008.

Jiang, Rui et al., "Tunable Vacuum ultraviolet laser based spectrometer for angle resolved photoemission spectroscopy" Review of Scientific Instruments 85, 033902 (2014) Aug. 1, 2014.

Wang, Li-Rong et al., "Generation of Ultraviolet Radiation at 266 nm with RbBe2BO3F2 Crystal" Chin. Phys. Lett., vol. 29, No. 6 (2012) 064203-1 to 4.

Zhang, H. et al., "175 to 210 nm widely tunable deep-ultraviolet light generation based on KBBF crystal" Appl. Phys. B (2008) 93:323-326.

* cited by examiner

DOUBLE LENS DEVICE FOR TUNABLE HARMONIC GENERATION OF LASER BEAMS IN KBBF/RBBF CRYSTALS OR OTHER NON-LINEAR OPTIC MATERIALS

GRANT REFERENCE

This invention was made with government support under Contract No. DE-AC02-07CH11358 awarded by U.S. Department of Energy. The government has certain rights in the invention.

BACKGROUND OF THE INVENTION

Field of the Invention

The present invention relates to harmonic generation of laser beams in nonlinear optical (NLO) materials including but not limited to KBBF/RBBF crystals and, in particular, harmonic generation over a substantial range of wavelengths with good efficiency.

Related Art

Alkali fluorberyllium borates such as in the form of potassium beryllium fluoroborate ($KBe_2BO_3F_2$ or KBBF) and beryllium boron rubidium fluoride ($RbBe_2BO_3F_2$ or RBBF) crystals for frequency multiplying of an input laser beam frequently rely on direct or indirect optical coupling with prisms or optical slabs. To generate higher harmonics the beam must propagate with certain angle (phase matching angle or PMA) relative the optical axis of the crystal. This strongly depends on wavelength of the beam. Discussion of PMA can be found at H. Zhang, G. Wang, L. Guo, A. Geng, Y. Bo, D. Cui, Z. Xu, R. Li, Y. Zhu, X. Wang, C. Chen, 175 to 210 nm widely tunable deep-ultraviolet light generation based on KBBF crystal, Applied Physics B, Vol. 93, Issue 2-3, pp. 323-326; C. T. Chen, L. L. Wang, X. Y. Wang, Z. Y. Xu, Deep-UV nonlinear optical crystal $KBe_2BO_3F_2$—discovery, growth, optical properties and applications, Applied Physics B, Vol. 97, Issue 1, pp, 9-25; and C. Chen, et al, Improved Sellmeier Equations and Phase-Matching Characteristics in Deep-Ultraviolet Region of $KBe_2BO_3F_2$ Crystal, IEEE Journal of Quantum Electronics, Vol. 44, Issue 7, pp. 617-621, each of which is incorporated by reference herein.

Examples of prism-based systems can be seen at U.S. Pat. No. 6,959,305 and published U.S. Patent Application US2014/0071519, both of which are incorporated by reference herein. Another example, and its use in a system applied to photoemission spectroscopy, is described in R. Jiang, D. Mou, Y Wu, L. Huang, C. McMillen, J. Kolis, H. G. Giesber III, J. J. Egan, and A. Kaminski, "Tunable Vacuum Ultraviolet Laser Based Spectrometer for Angle Resolved Photoemission Spectroscopy", Review of Scientific Instruments 85, 033902 (2014) (available on-line at http://dx.doi.org/10/1063/1.4867517), also incorporated by reference herein.

However, coupling the incoming or outgoing beam is efficient for only a small range of wavelengths because the faces of such prisms are cut at predefined angles. For example, the range of effective acceptance angles for PMA may be on the order of 5 to 10° relative to the prism face and this tends to limit the wavelengths that can effectively be utilized.

Additionally, a variety of factors can affect or influence the conversion efficiency from the incoming source laser to the generated harmonic beam. Using angle tilting for PMA requires components and techniques to vary the orientation of the crystal (and its optical axis) to the incoming beam. Utilization of optical components (including prisms and optically clear slabs) at the crystal can involve losses at the respective interfaces.

Similar issues can exist with other NLO materials. Therefore, there is room for improvement in this technical art.

SUMMARY OF THE INVENTION

Objects

It is therefore a principle object, feature, aspect, or advantage of the present invention to improve over or solve problems and deficiencies in the technical art.

Further objects, features, aspects, or advantages of the present invention relate to an apparatus, system, or method of harmonic generation of lasers in non-linear optical materials which:

a. is effective and efficient for a substantial range of laser wavelengths; at least a larger range than prism or slab-based optical couplers to such non-linear optical material;
b. accommodates a substantial range of incident or acceptance angles;
c. is economical because it can be used for a wide range of applications without change out or substitution of optical couplers;
d. can be included in a variety of laser harmonic generation systems or applications;
e. can maintain or improve conversion efficiencies in frequency multiplication applications by reduced optical reflection losses through the system; and
f. reduces the angle at which the second harmonic beam propagates from the device when compared to prism based devices.

Aspects of the Invention

Instead of prisms or slabs, a pair of lenses is optically coupled to opposite faces of the non-linear material. The lenses have optical properties which keep any laser aimed at the centroid of the crystal perpendicular or normal to the lens surface over a range of orientations of the device to the laser beam; both as the beam enters the first lens and as it exits the second lens. This reduces or minimizes reflection losses at those surfaces, which increases efficiency of the optical coupling.

In one aspect, the lenses are plano-convex with the planar surfaces directly or indirectly optically coupled at opposite faces of the non-linear material. The center of the radius of the convex portions of each lens is designed to be at the center of the non-linear material when assembled to the NLO material. Thus, this promotes a perpendicular angle of incidence relative that convex portion for any incoming beam aimed at the center of the NLO material. Examples of the plano-convex lens can be plano-cylindrical or plano-spherical. Examples of non-linear optical material are KBBF or RBBF. Others are possible.

In another aspect, the plano-convex lenses are made of a material which can withstand the rigors of a variety of types and powers of laser energy. One example is $CaF_2$ (calcium fluoride). Others are possible.

In another aspect, the lenses are directly optically coupled to the non-linear material by pressure on each lens towards the non-linear material. Optionally, the apex of the convex side of each lens can be flattened to present a hospitable surface for even application of pressure on the lenses.

In another aspect, selection of type of plano-convex lens for each side, as well as orientation, can be selected according to design or need. In one example, plano-cylindrical lenses on opposite sides of the NLO material can be coupled to the non-linear material at 90 degrees offset instead of parallel. This can be utilized to correct the elliptical shape of the second harmonic beam. In another aspect, a plano-spherical lens can be on one side of the non-linear material and a plano-cylindrical on the opposite side.

In another aspect, the dual lens combination with NLO material can be combined with additional lenses, optical components, and other system components for tunable angle-tilting PMA for optical frequency multiplying of a source laser.

Other objects, features, aspects, and advantages of the present invention will become more apparent with reference to the accompanying specification claims.

BRIEF DESCRIPTION OF THE DRAWINGS

FIGS. 2A-C are further enlarged views of a conventional KBBF/RBBF non-linear crystal such as could be used in embodiments of FIG. 1A. The views include reference axes that intersect in the middle of the crystal. FIG. 2C is a perspective view. FIGS. 2A and 2B are end and side elevation views, respectively, of FIG. 2C.

DETAILED DESCRIPTION OF EXEMPLARY EMBODIMENTS OF THE INVENTION

Overview

For a better understanding of the invention, examples of some of the forms it can take will now be described in detail. These are for illustrative purposes only and neither exclusive nor inclusive.

The examples will be discussed primarily in the context of the non-linear material being KBBF or RBBF. However, the invention is not so limited.

Frequent reference will be made to the drawings, which are itemized above. Reference numerals, letters, or indications will be used to indicate certain parts or locations in the drawings. The same reference indications will be used for the same or analogous parts or locations throughout the drawings unless otherwise indicated.

Figure 1A:
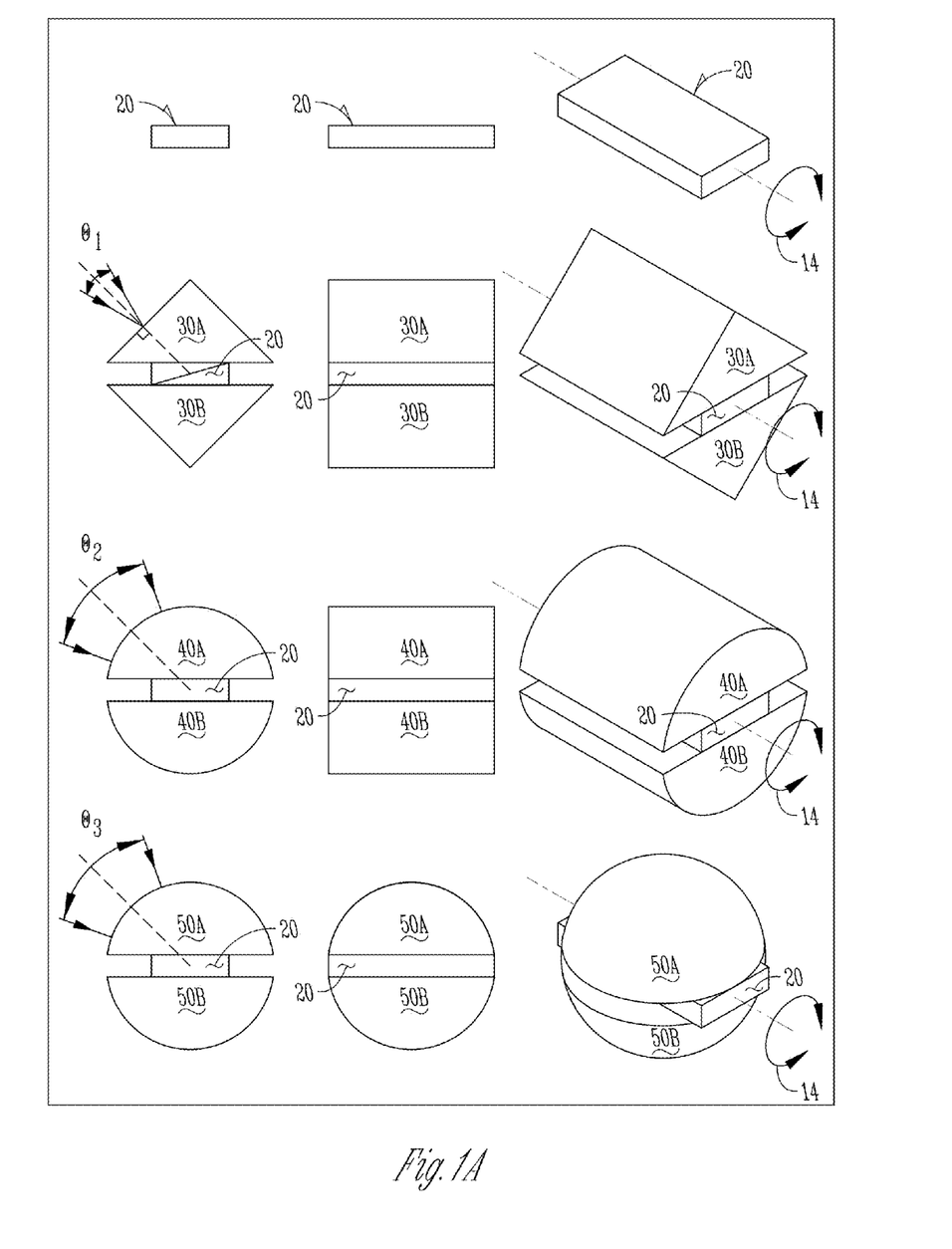
FIG. 1A is an enlarged scale set of diagrams illustrating in different views, for comparison, a generalized KBBF or RBBF crystal (top row), a state-of-the-art prism-based optical coupling of lasers to a non-linear material such as a KBBF or RBBF crystal (second row) versus plano-cylindrical and plano-spherical exemplary embodiments according to the present invention (third and fourth rows respectively).
Figure 2A:
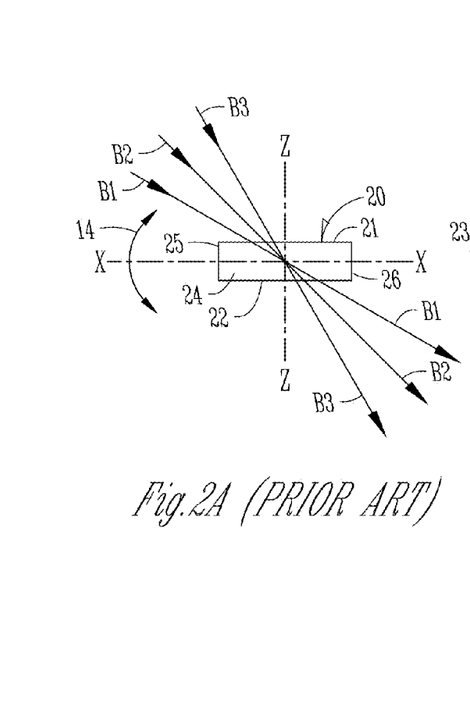
Figure 2B:
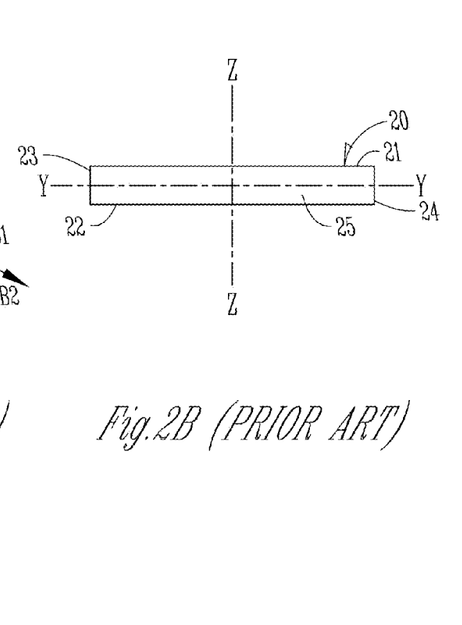
Figure 2C:
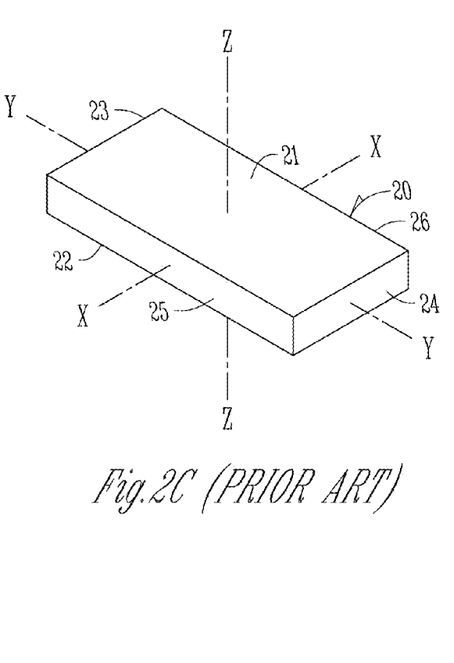

FIG. 1A (top row) and FIGS. 2A-C diagrammatically illustrate an idealized form factor of a typical KBBF or RBBF non-linear crystal 20 with the origin of the X-Y-Z coordinate system centered in the center of the crystal body. Crystal 20 is depicted as a rectangular cross-section and is elongated along the Y-axis. The Z-axis passes through and is orthogonal to opposite faces 21 and 22. The optical axis may vary from the X-Y-Z axes. Opposite side faces 26 along the Y-axis of crystal 20, and opposite end faces 23 and 24, can be planar or otherwise. However, as is well known in the art, the specific form factor of such crystals may not be in that symmetrical shape. It is generally beneficial that the adjacent surfaces of the NLO material and the prisms be substantially smooth.

FIG. 2A diagrammatically illustrates three different possible laser beams B1, B2, and B3, each at different incident angles to crystal 20. Crystal 20 can be rotated (angle-tilted) in fine increments about the Y-axis and in the XZ plane (see arrow 14) to obtain different incident beam angles between its faces 21 and 22, which relate to different phase matching angles through crystal 20. As is well appreciated, the different angles of incidence can result in different beam propagation paths through the material.

Figure 1B:
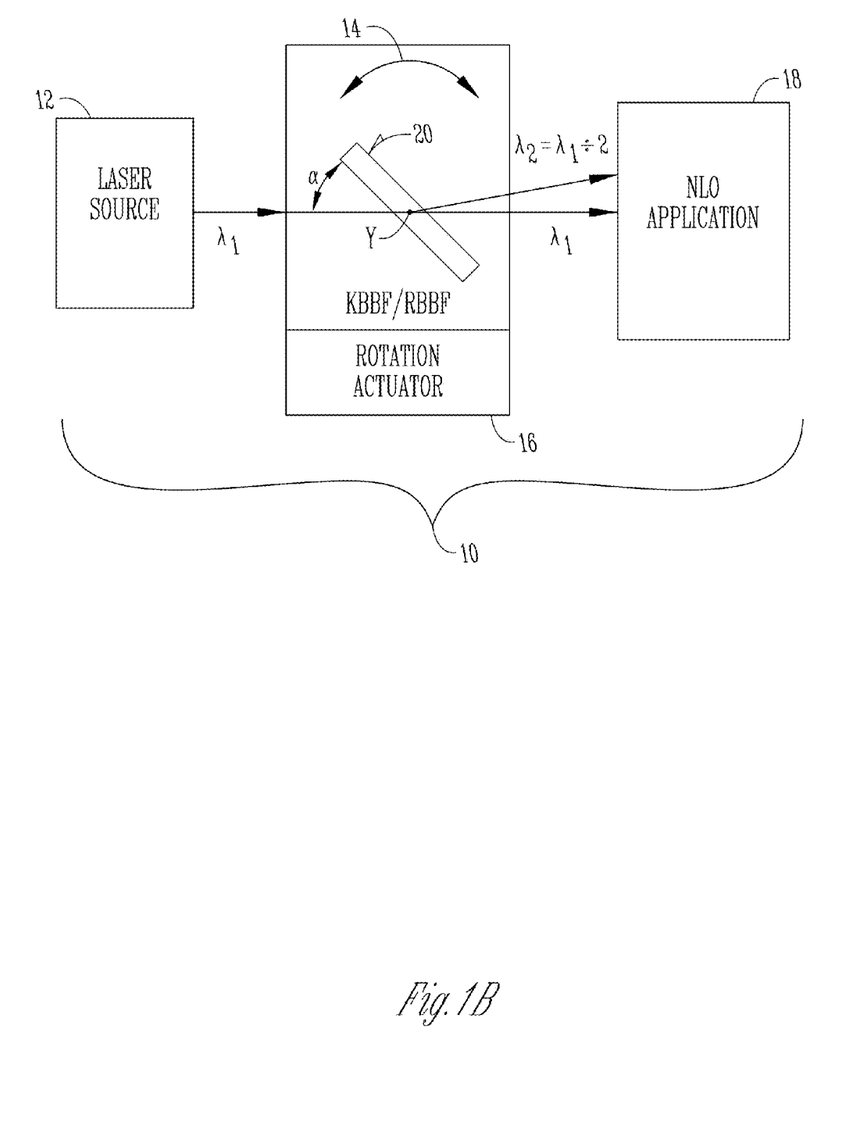
FIG. 1B is a highly diagrammatic illustration of a system that uses a KBBF/RBBF crystal in an NLO application, such as generating a second generation harmonic (SHG), or higher orders, from a source laser for very long wavelengths (>600 nm) for which no coupling device is required.

FIG. 1B generically diagrammatically illustrates a KBBF or RBBF crystal 20 in combination with a system 10 that can be used in an NLO application 18. An actuator 16 provides minutely adjustable rotation control of crystal 20 relative to laser 12 to produce an output for an NLO application 18. One example is conversion of laser energy at wavelength $\lambda_1$ into a second generation harmonic (see $\lambda_2$ in FIG. 1B) by rotating the NLO material 20 around the Y-axis to a PMA angle α. A discussion of such systems are described at Jiang, et al., Rev. Sci. Instrument. 85, 033902 (2014), referenced above. Such systems are well-known to those skilled in the art. A few examples of NLO applications 18 for system 10 are inspection of solid state microchips, chemical sensing, and research and development regarding superconductors.

As can be appreciated by those skilled in the art, a system 10 can be applied to other NLO material 20 in analogous ways.

Generalized Illustration of Exemplary Embodiments of the Invention

Figures 3A, 3B:
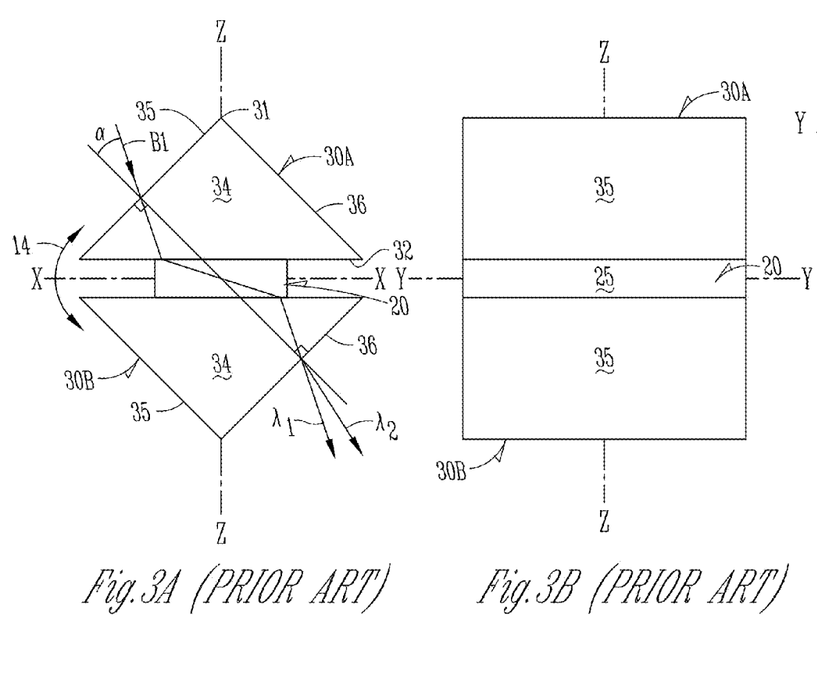
FIGS. 3A-C are enlarged end elevation, side elevation, and perspective views, respectively, of the crystal of FIGS. 2A-C sandwiched by a pair of right prisms such as used on some conventional laser harmonic generation systems to optically couple a laser to the crystal and as are depicted in the second row of FIG. 1A.
Figure 3C:
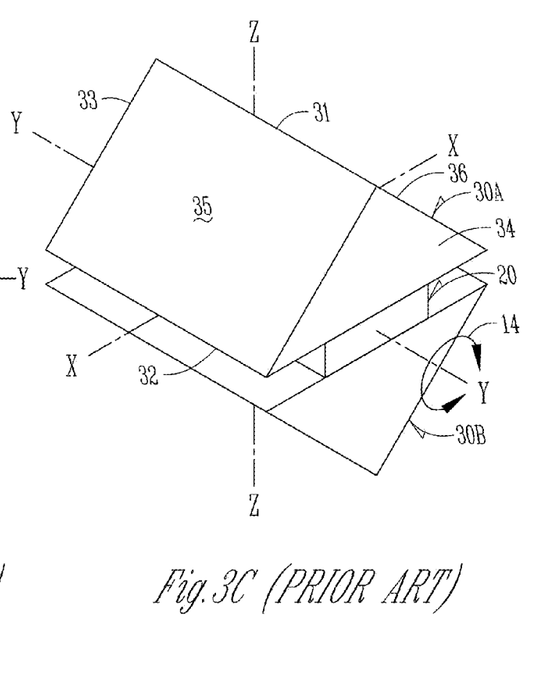

It can be difficult to achieve the proper beam propagation direction through just an NLO material such as KBBF or RBBF crystal 20 of FIGS. 2A-C. Therefore, one conventional state of the art solution is use of a pair of prisms 30A and 30B on opposite faces of crystal 20, as illustrated in FIGS. 3A-C (see also second row of FIG. 1A). See also incorporated by reference U.S. Pat. No. 6,959,305, published U.S. Patent Application US2014/0071519, and Jiang, et al., Rev. Sci. Instrum. 85, 033902 (2014).

FIGS. 3A-C show crystal 20 in a conventional combination with a pair of right prisms 30A and 30B at opposing faces 21 and 22 of crystal 20. As illustrated in U.S. Pat. No. 6,959,305 and published U.S. Patent Application US2014/0071519, typical angles α of incidence of laser beam B1 are refracted at surface 35 of prism 30A, producing a pre-known angle through opposite faces 21 and 22 of crystal 20, and exiting surface 36 of prism 30B. If the appropriate phase matching angle is achieved through crystal 20, the exiting laser will have at least two different harmonics of the fundamental (see $\lambda_1$ and $\lambda_2$ in FIG. 3A). But as mentioned, the predetermined angles of faces 35 and 36 of prisms 30A and 30B limit the range of wavelengths that can produce harmonics of the fundamental.

Some state-of-the-art systems use rectangular-in-cross-section slabs (not shown) of optical material instead of or with prisms. They suffer from some of the same issues as prisms. In both prism and slab configurations, for larger incident angles increased reflection losses will occur at each prism surface beam B passes. Therefore, there is room for improvement in this technical art.

The bottom two rows of FIG. 1A illustrate two exemplary embodiments according the invention which address the problems with state-of-the-art solutions. Instead of prisms, plano-convex lenses are used. Each lens has a convex surface with a constant radius of curvature relative the center of NLO material 20 (see radius r in FIGS. 4A-C and 5A-C). Therefore, irrespective of the rotational position of the surface to the incident laser (see, e.g., angle ranges θ), a laser aimed at that center of NLO material 20 will always be at least substantially perpendicular to the lens curved outer surface. This will reduce or eliminate reflective loss at that interface. In addition, a second lens at the opposite NLO surface should reduce reflective loss in a similar way for the exiting beam. The second lens also has a constant radius of curvature relative the center of NLO material 20.

For comparison, FIG. 1A illustrates, in one page, the general differences between conventional prism-type optical coupling and embodiments of plano-convex dual lens optical coupling according to the present invention. One embodiment substitutes plano-cylindrical lenses 40A and 40B for prisms 30A and 30B. Another embodiment substitutes plano-spherical lenses 50A and 50B for prisms 30A and 30B.

Rotation of the dual lens/NLO combination 40A/20/40B or 50A/20/50B of FIG. 1A in either direction of arrow 14 can support a larger range of rotation and reduce reflection losses as compared to the prism/NLO material combination of 30A/20/30B or just the NLO material 20 (top row of FIG. 1A).

Additional details of these benefits will become more apparent in the more specific examples below.

First Specific Exemplary Embodiment

Figure 4A:
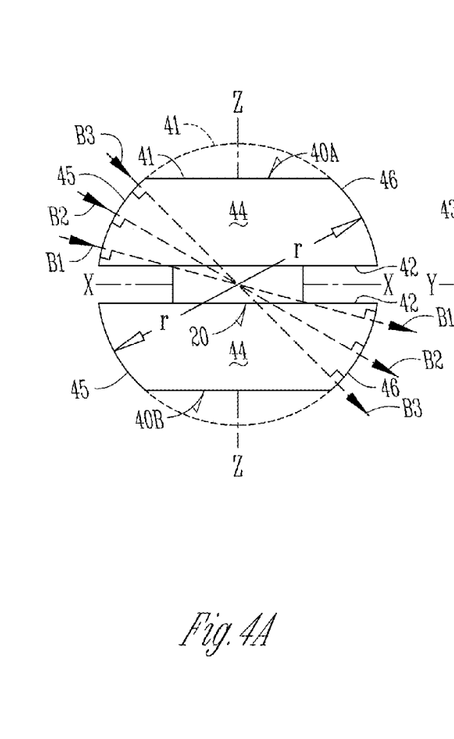
FIGS. 4A-C are enlarged end elevation, side elevation, and perspective views of the crystal of FIGS. 2A-C sandwiched by a pair of plano-cylindrical lenses according to a first exemplary embodiment of the present invention and as depicted in the third row of FIG. 1A.
Figure 4B:
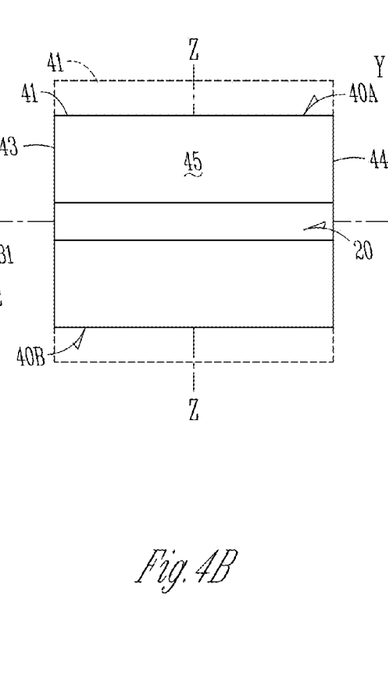
Figure 4C:
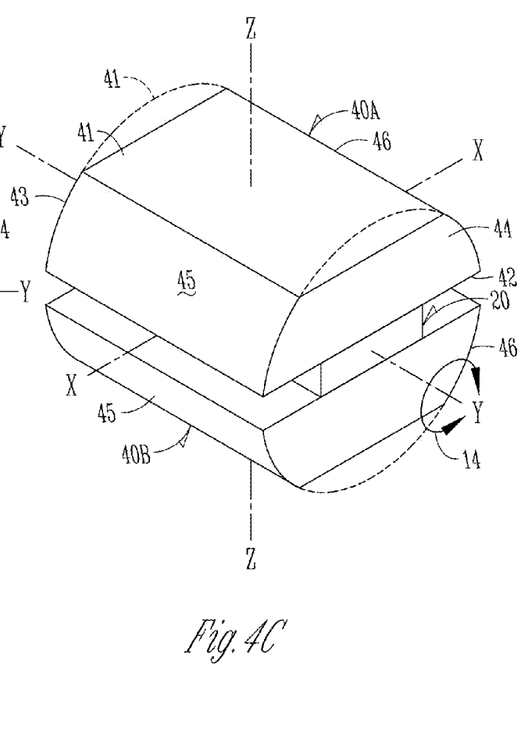
Figure 5A:
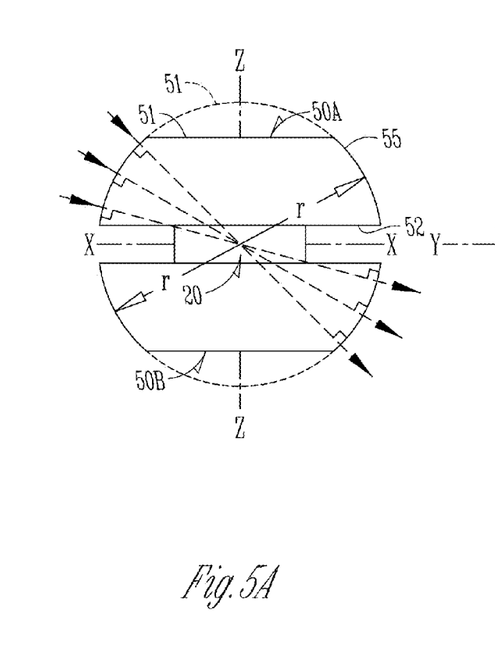
FIGS. 5A-C are enlarged end elevation, side elevation, and perspective views of the crystal of FIGS. 2A-C sandwiched by a pair of plano-spherical lenses according to a second exemplary embodiment of the present invention and as depicted in the fourth or bottom row of FIG. 1A.
Figure 5B:
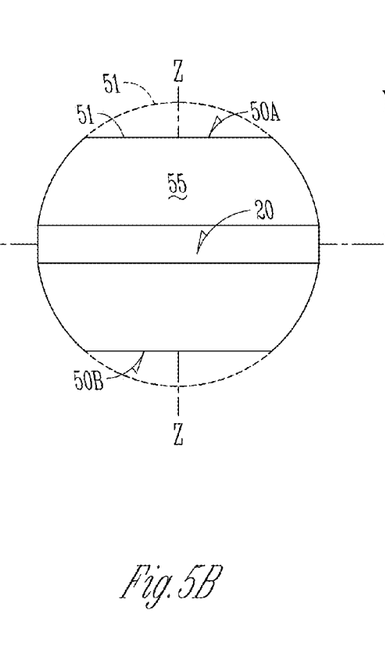
Figure 5C:
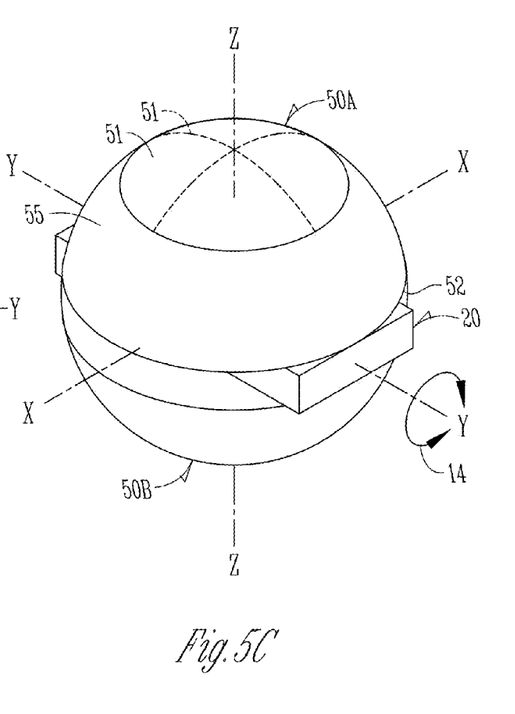

Instead of prisms or slabs, FIGS. 4A-C illustrate use of dual lenses 40A and 40B at opposite faces 21 and 22 of crystal 20. Each lens 40A or B in this embodiment is characterized as follows:

a. $CaF_2$ material—economically formed and handles laser energy at the power levels needed.
b. Plano-cylindrical—planar side 42 covers at least a substantial area of surface 21 or 22 of crystal 20, has at least convex side portions 45 and 46 and a curved top or apex 41 (dashed lines), and opposite ends 43 and 44.
c. Optional flattened apex—by polishing, machining, or other methods creates a substantially planar apex 41 (solid lines) at least substantially parallel to planar side 42. This is optional but can be beneficial as an interface for application of mechanical force towards crystal 20 in the Z axis direction. It can promote better optical coupling, as is well appreciated by those skilled in the art.
d. Radius r is at least substantially centered at the origin of axes X/Y/Z in the centroid of crystal 20 when planar side 42 is mounted in operative position relative to a face 21 or 22 of crystal 20, as shown in FIG. 4A.

As diagrammatically illustrated in FIG. 4A, the combination 40A/20/40B can be rotated (see arrow 14 of FIG. 4C) to fine increments or continuously around axis Y to allow its convex surface align to with a laser beam. Because radius r is centered at the origin of XYZ (which is at the center of crystal 20), so long as beam B is aligned with that origin XYZ, beam B would enter lens 40A perpendicular to its incident surface (see perpendicular notation at the interface of each beam B1, B2, and B3 with their incident points at the curved lens surfaces, both incoming and exiting). As such, by the laws of physics, ideally there is no reflection loss. Practically, reflection (Fresnel) loss is minimized at least in comparison to prism or slab configurations over the range of acceptance angles for lens 40A. This could result in reduction of the reflection losses in the approximate range of from 15% to 5% over the full range of tunable wavelengths/acceptance angles. Moreover, with good optical coupling of planar surface 42 of lens 40A with face 21 of crystal 20, reflection (Fresnel) loss would likewise be reduced or minimized. Reflection loss tends to increase with angle of incidence especially for the exit interface.

And by essentially mirror-image assembly of second lens 40B at face 22 of crystal 20, reflection losses at planar side 42 of lens 30B and the exiting of beam B from convex side portion 46 of lens 30B result in minimized reflection loss. This is according to the well-known law of physics that an angle of incidence perpendicular to an optical surface reduces reflection at that interface.

Reduction of reflection loss improves efficiency of the system. It improves effectiveness in that more light energy is available for both generation of harmonics of the fundamental laser wavelength and for the power of the generated harmonic. It also results in more energy available at the intended application site for the generated laser after it exits lens 40B. Other benefits include reduction of the variation of second harmonic beam intensity with fundamental wavelength, again due to minimized reflection losses that are made independent of phase matching angle by the device design.

By utilization of actuators (e.g. piezoelectric stages or motors having micro or even nanoscale precision), the combination 40A/20/40B can be rotated around the Y-axis to produce minimized reflection of beams B over at least an angular range (diagrammatically depicted in FIG. 4A). This can allow, for example, a range 20-75 deg. of beam angles (i.e. full range of phase matching angles) through and between crystal faces 21 and 22. This allows a range of phase matching angles that can generate a range of 170-700 nm wavelengths continuously without need to swap the device for one with a different set of prisms on lenses.

The plano-cylindrical shape of lenses 40A and 40B tends to direct the beam B in the X/Z plane.

An optional feature is flattening of the apex of lenses 40A and 40B at apex areas 41 (compare unflattened profile at dashed line labeled 41 in FIGS. 4A-C with flattened profile at solid lines 41). Pressure in the direction of crystal 20 urges planar surfaces 42 of lenses 40A and 40B into tight and direct contact with opposite crystal faces 21 and 22. This pressure can be produced in a number of ways. One example is a clamping member (highly diagrammatically illustrated at FIG. 8). Flattened areas 41 allow the pressure to be spread more evenly than if applied against a curved surface and, thus, achieve a more effective optical direct bonding for loss reflection loss. One way to produce flattened areas in $CaF_2$ lens material is through polishing. Other techniques are possible. On the other hand, techniques are possible to apply converging pressure on the dual lens system without flattening apexes of the lenses. One example is using elongated rows cut in a metal holder to secure regular plano-cylindrical lenses without need to flatten their tops (see FIGS. 9A-B). The form factor of lenses 40A and 40B does not have to precisely match the perimeters of opposing crystal faces 21 and 22. But as illustrated in FIGS. 4A-C, lenses 40A and 40B normally at least cover the X/Z plane through the origin at the center of crystal 20. It can be beneficial, for a number of reasons, to cover most of the opposed faces 21 and 22 of crystal 20.

Second Specific Exemplary Embodiment

Plano-spherical lenses 50A and 50B can be used instead of plano-cylindrical lenses. See FIGS. 5A-C. Again, the form factor normally should cover at least the XZ plane through crystal 20 and the radius of curvature of convex sidewall 55 should be constant from the center of crystal 20 (radii r for each lens 50A and 50B in FIG. 5A should be equal).

It should be noted that plano-spherical lenses also promote minimized reflection losses over an operative range of angles of incidence with its convex surface (entering or exiting). This produces similar advantages to the plano-cylindrical lenses 30.

But it is to be appreciated that plano-spherical lenses 50A and 50B can be beneficial in instances where a tightly controlled exiting laser spot is not needed, desired, or important, and where there is tolerance for some spherical aberration. It is more difficult to precisely align beam B and convex side portion 45 of lens 40A to produce precisely perpendicular/orthogonal angle of incidence. This is because side 45 of plano-cylindrical lens 40A is curved relative to one plane only. With a plano-spherical lens, convex side 55 is curved relative two planes. Therefore, some aberration may occur.

Like the prior embodiment, a flattened apex, here at the center of thickness of each lens 50A and B (see solid line 51 in FIGS. 5A-C) is an option to promote an effective area to apply clamping force or pressure.

Third Specific Exemplary Embodiment

Figure 6A:
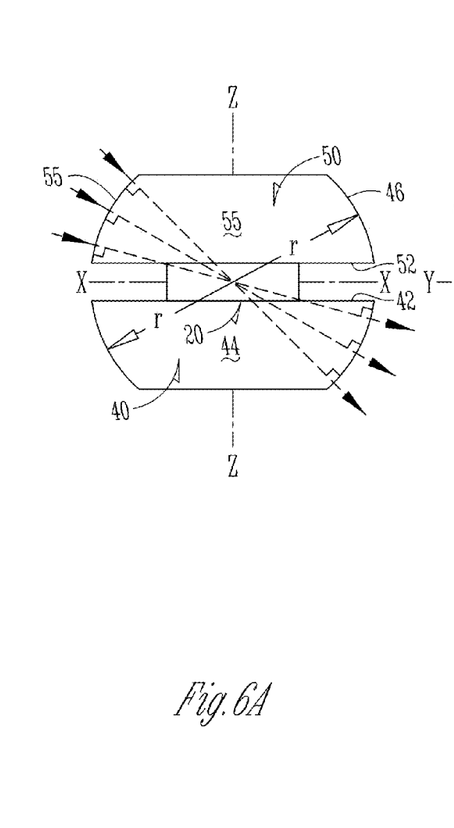
FIGS. 6A-C are similar to FIG. 4A-C or 5A-C but illustrate an alternative embodiment of a plano-spherical lens on one side of the non-linear material and a plano-cylindrical lens on the opposite side.
Figure 6B:
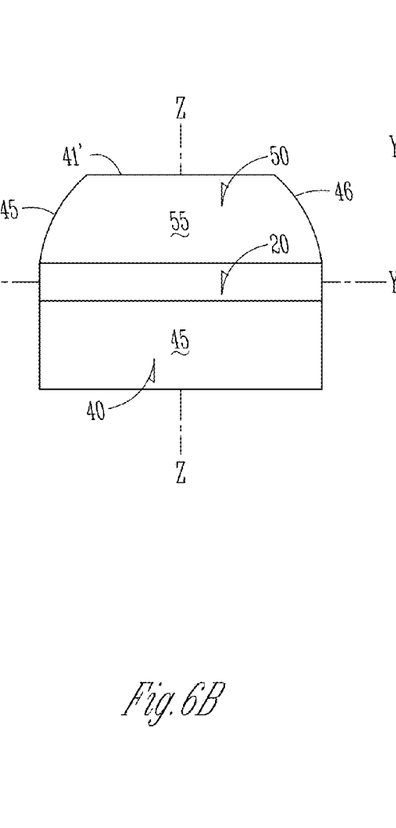
Figure 6C:
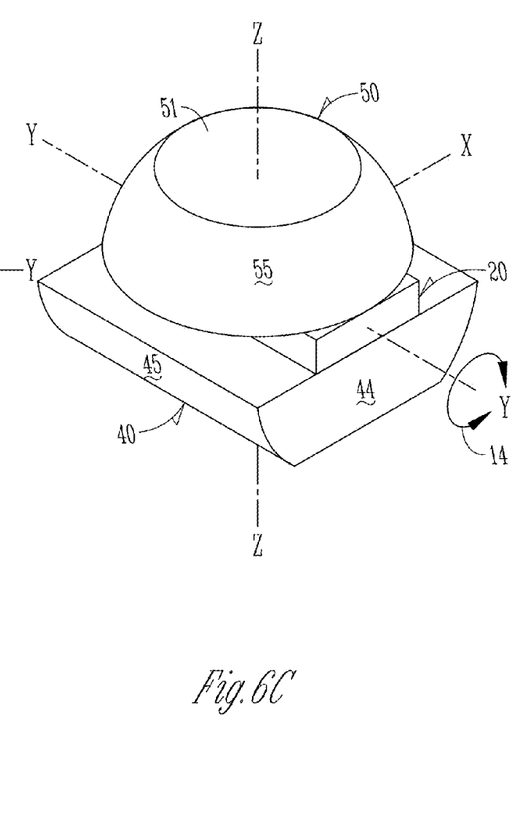
Figure 7A:
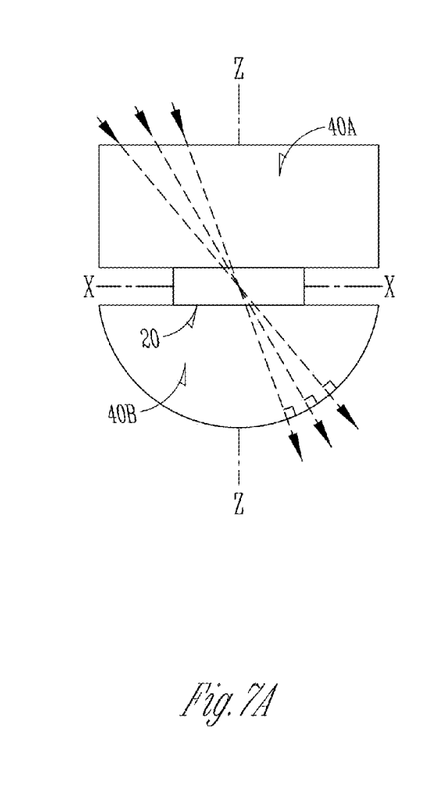
FIGS. 7A-C are similar to FIGS. 4A-C except rotate one of the plano-cylindrical lenses 90 degrees along the Z-axis relative the other lens.
Figure 7B:
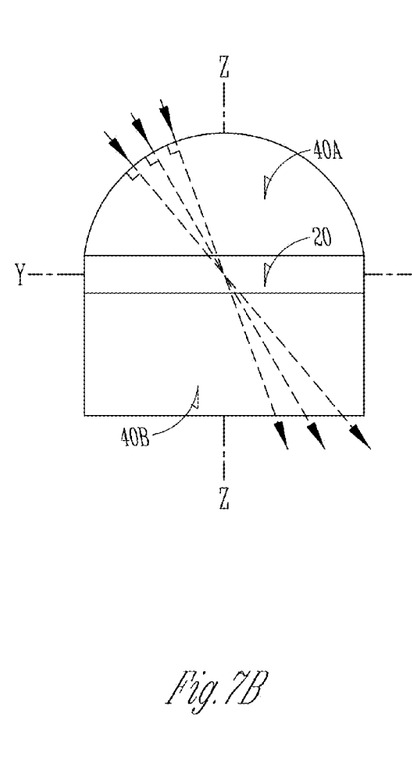
Figure 7C:
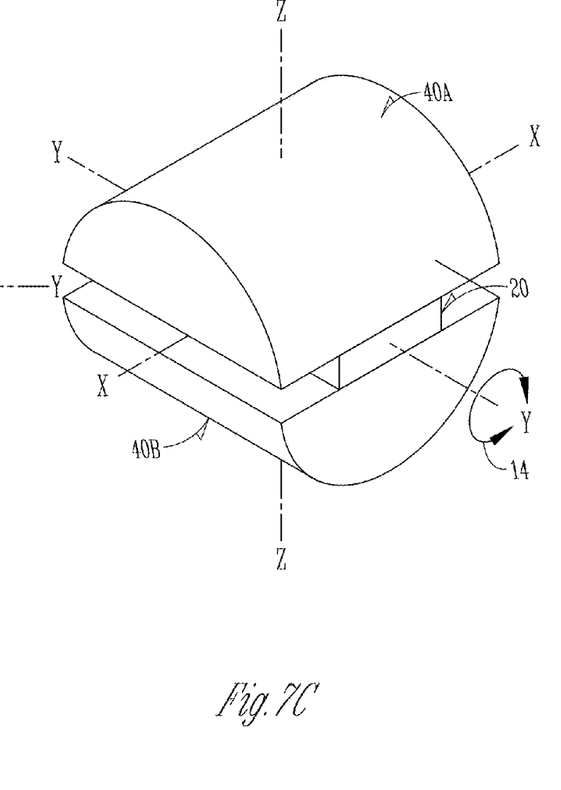

An alternative embodiment is illustrated in FIGS. 6A-C. Plano-cylindrical lens 50 and plano-cylindrical lens 40 sandwich crystal 20.

Fourth Exemplary Embodiment

A further embodiment could be plano-cylindrical lenses 40A and 40B on opposite sides of crystal 20 but one lens rotated 90 degrees relative the other around the Z-axis to promote reduction in aberration.

Options and Alternatives

The foregoing examples are not limiting. Variations obvious to those skilled in the art will be included within the invention. Some examples are as follows.

NLO material. KBBF or RBBF group materials have been discussed. KBBF and RBBF crystals are available from various commercial sources. One example is Advanced Photonic Crystals, LLC, 377 Rubin Center Drive, Suite 207, Fort Mill, S.C. 29708, USA. A discussion of such crystals can be found at U.S. Pat. No. 8,834,629, incorporated by reference herein. But the invention may be applicable to other crystal groups or other NLO materials. An example is $CsBe_2BO_3F_2$ (see H. Huang, C. Chen, X. Wang, Y. Zhu, G. Wang, X. Zhang, L. Wang, J. Yao, "Ultraviolet nonlinear optical crystal: $CsBe_2BO_3F_2$", J. Opt. Soc. Am. B, Vol. 28, No. 9 (September 2011), incorporated by reference herein). Another discussion of NLO materials is at published patent application US2011/0222143 to inventors Chen, Wen, Li, and Zhang entitled "Fluoroberyllium borate non-linear optical crystal, their growth methods and uses", incorporated by reference herein. Other examples that have been reported useful for frequency doubling are lithium niobate ($LiNbO_3$), potassium titanyl phosphate (KTP=$KTiOPO_4$), and lithium triborate (LBO=$LiB_3O_5$). An example of a material reported useful for higher order frequency multiplication is potassium dihydrogen phosphate (KDP). Others are possible and being developed. Typical dimensions for crystal 20 are on the order of from approximately 1 to several tens of centimeters in length (Y-axis in FIG. 2C) and width (X-axis) by several mm in thickness (Z-axis). One example is in the order of one cm in length and width and 3 mm in thickness. Other sizes are possible, as are other non-linear materials.

Lens material. Other materials than mentioned above are possible. Ideally they need to withstand the rigors of the laser energy utilized and have optical properties that are effective for the desired application. Other materials and methods for use with high power lasers are discussed in U.S. Pat. No. 8,274,743 incorporated by reference herein. The lenses benefit from being made of materials that are transparent in the used range of wavelengths.

Figure 8:
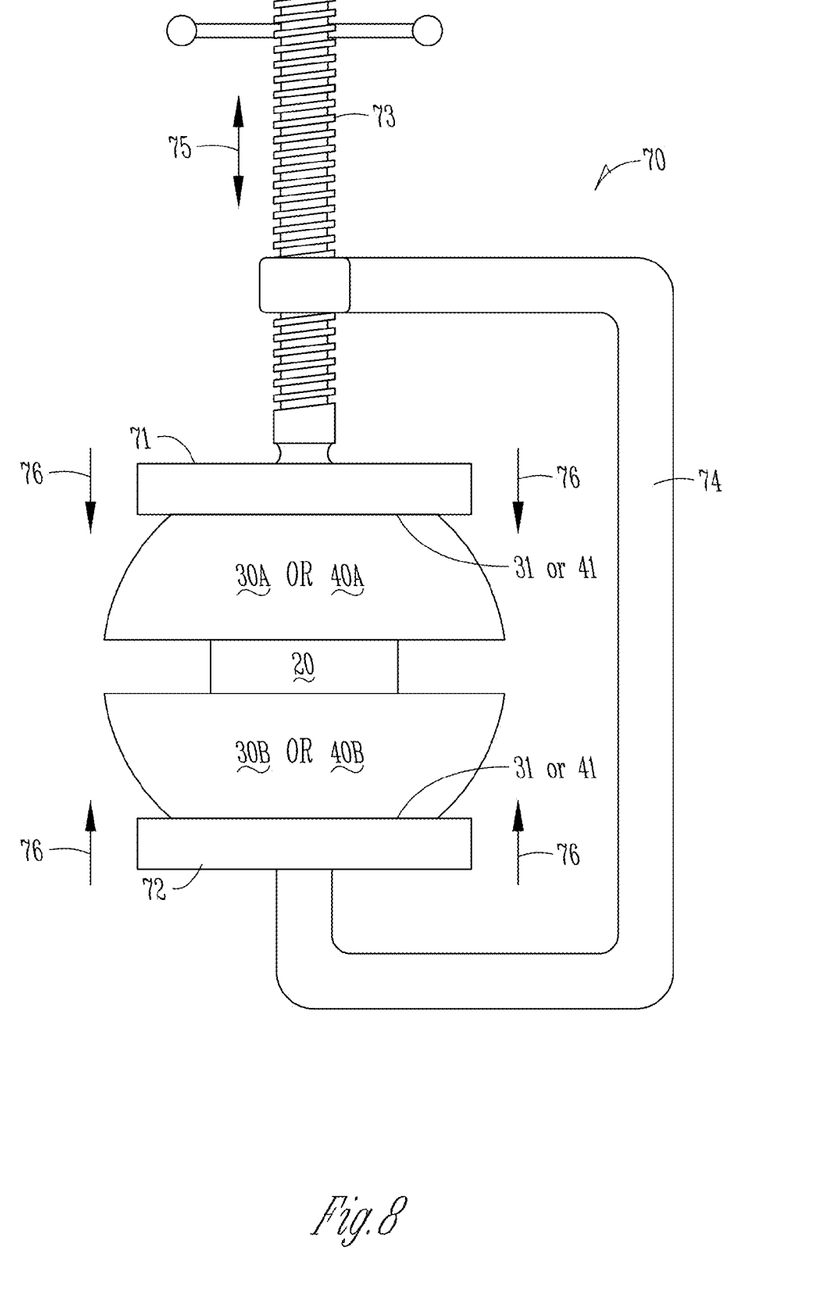
FIG. 8 is a highly diagrammatic depiction of utilizing converging or clamping forces from opposite sides of the combination of FIG. 4A to directly optically couple the plano-cylindrical lenses to opposite faces of the crystal.

Clamping sub-system. A variety of possibilities exist. The sandwiching or clamping arrangement at FIG. 8 is for prisms on opposite faces of the NLO material. It could be adapted for supporting direct coupling and clamping pressure for the embodiments of the invention. As illustrated in FIG. 8, jaws 71 and 72 having complimentary surfaces to flattened tops 31 or 41 of the lenses can be placed in abutment to the combination of lenses and NLO material. Some mechanism mechanically connected to jaws 71 and 72 can be adjustable to converge jaws 71 and 72 relative to one another (in the direction of arrows 76) to clamp the combination of lenses and NLO material together. Of course, the precise mechanism and form factors can be designed according to need or desire. FIG. 8 is meant to illustrate functionally the technique. In a similar general manner to a conventional C-clamp 74, a threaded rod 73 connected to jaw 71 could be rotated in a complimentary threaded boar in C-clamp 74 to linearally adjust threaded rod 73 relative to C-clamp 74. This linear adjustability 75 would allow converging pressure in the direction of arrows 76.

Figure 9A:
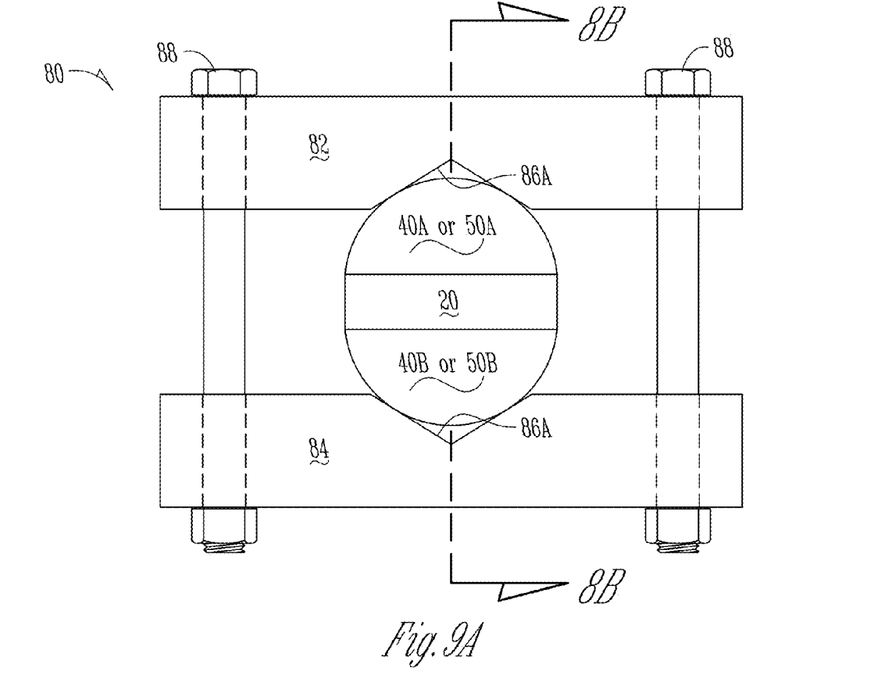
FIGS. 9A and B are highly diagrammatical alternative diagrammatic depictions of a mount for the combined lenses and non-linear material.
Figure 9B:
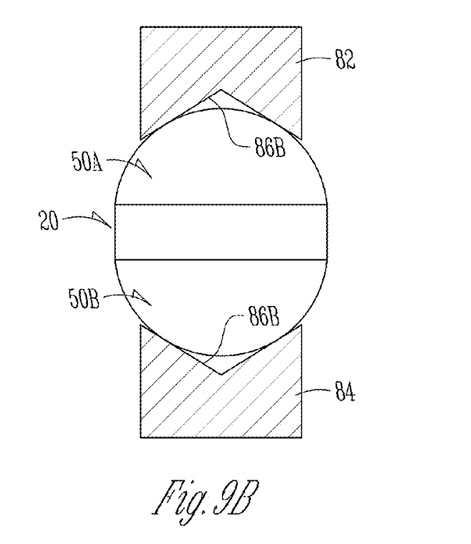

As previously mentioned, however, if the apex of each lens is not flattened, converging pressure could be applied also. One simple possibility is to clamp the lenses in a holder with centering receivers for the curved lens, removing the need to flatten their tops. A highly diagrammatical version is shown in FIGS. 9A and B. Whether plano-spherical or plano-cylindrical, the combination of lenses on opposite sides of NLO material 20 could seat within some type of receiver (here diagrammatically illustrated as a V-notch or notches 86) that would basically center the combination along the Z-axis. Opposed plates 82 and 84 of the holder could be adjusted with converging forces towards one another to sandwich or clamp the lens/NLO combination together in a releasable fashion. Such a mounting system 80 could utilize simple bolts 88 through apertures in one plate 82 and into aligned apertures in bottom plate 86 for adjustability and removability to add in a different lens/NLO material combination. Nuts could be tightened on threaded ends of bolts 88 to exert converging forces. There could be two bolts 88 or other numbers such that relatively even converging forces can be generated. As diagrammatically illustrated in FIGS. 9A and B, if plano-cylindrical lenses 40A and B need to be clamped, only single parallel notches 86A and plates 82 and 84 might be needed to center the combination along the Z-axis. However, as further indicated at FIG. 9B, if plano-cylindrical lenses 50A and B are to be clamped, a second V-notch 86B in both plates 82 and 84, intersecting and at 90 degrees to notches 86A relative to the X, Y, and Z axes. The combination centers the lenses 50A and B along the Z-axis relative to both the X and Y axes. Other configurations are, of course, possible. See, for example, U.S. Pat. No. 6,500,364, incorporated by reference.

As can be appreciated by those skilled in the art, the aspects of the disclosed invention can be applied in different contexts in different applications. One example is second generation harmonic (SGH). For higher harmonic generation, as known by those skilled in the art, it involves passing two or more beams through the device. Aspects of the present invention can make this easier by allowing each of the beams to be perpendicular to the coupling device surface.

Form factor of the lenses can vary according to need or desire. It can be beneficial that the diameter of the plano-cylindrical or plano-spherical lens be comparable to the size of the NLO crystal to facilitate easier mounting. When constructing the system, one should take into account the focusing properties of the plano-spherical/plano-cylindrical lenses. For example, in certain applications it can be indicated or beneficial to use longer focal length primary focusing lenses.

What is claimed is:

1. A method of tunable harmonic generation of laser beams in a nonlinear optical material comprising:
    directing a laser beam over a range of phase-matching angles to and from a nonlinear optical material through optically coupled lenses at opposite faces of the nonlinear optical material, the optically coupled lenses having portions on outer surfaces which cause incoming and exiting beams to be at or near perpendicular to the portions on the outer surfaces of the lenses over a range of phase matching angles.

2. The method of claim 1 wherein the lenses are plano-convex lenses.

3. The method of claim 2 wherein the portion of each lens has a convex surface with a radius of curvature and the nonlinear optical material has a centroid, and when the lens is mounted to the nonlinear optical material, the radius of curvature of the convex surface is constant relative the nonlinear optical material centroid.

4. The method of claim 2 wherein the plano-convex lenses are plano-cylindrical.

5. The method of claim 2 wherein the plano-convex lenses are plano-spherical.

6. The method of claim 5 wherein the exiting beam is not tightly controlled and aberration can be tolerated.

7. The method of claim 2 wherein each lens has an apex or center of thickness that is flattened to present a surface to allow directional pressure to be exerted against it.

8. The method of claim 2 wherein one plano-convex lens comprises a plano-spherical lens and the other plano-convex lens comprises a plano-cylindrical lens.

9. The method claim 2 wherein the plano-convex lens comprise plano-cylindrical lenses rotated 90 degrees relative to one another around an axis through the lenses and non-linear optical material.

10. The method of claim 1 wherein the nonlinear optical material comprises $KBe_2BO_3F_2$, $RbBe_2BO_3F_2$, or $CsBe_2BO_3F_2$.

11. The method of claim 1 further comprising applying converging pressure or force to outer surfaces of the lenses and towards the non-linear material to promote direct coupling of planar sides of the lens to opposite faces of the crystal.

12. The method of claim 1 further comprising an additional optical component between planar sides of the lenses and opposite faces of the crystal to promote indirect coupling of the lenses to the crystal.

13. The method of claim 1 wherein the lenses comprise $CaF_2$.

* * * * *

UNITED STATES PATENT AND TRADEMARK OFFICE
CERTIFICATE OF CORRECTION

PATENT NO. : 9,740,081 B1  
APPLICATION NO. : 14/627925  
DATED : August 22, 2017  
INVENTOR(S) : Adam Kaminski

Page 1 of 1

It is certified that error appears in the above-identified patent and that said Letters Patent is hereby corrected as shown below:

On the Title Page (73) Assignee:  
Insert --University-- after State

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*